(12) United States Patent
Su et al.

(10) Patent No.: US 8,537,886 B1
(45) Date of Patent: Sep. 17, 2013

(54) RECONFIGURABLE EQUALIZATION ARCHITECTURE FOR HIGH-SPEED RECEIVERS

(75) Inventors: Xiaoyan Su, San Jose, CA (US); Sriram Narayan, Pleasanton, CA (US); Sergey Shumarayev, Los Altos Hills, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/541,917

(22) Filed: Jul. 5, 2012

(51) Int. Cl.
*H03H 7/40* (2006.01)

(52) U.S. Cl.
USPC .......................................... 375/233; 375/350

(58) Field of Classification Search
None
See application file for complete search history.

(56) References Cited

U.S. PATENT DOCUMENTS

| | | | |
|---|---|---|---|
| 7,915,941 | B1 | 3/2011 | Pan et al. |
| 8,335,249 | B1 | 12/2012 | Su et al. |
| 2007/0140329 | A1* | 6/2007 | Zhang et al. ................ 375/233 |
| 2010/0202506 | A1* | 8/2010 | Bulzacchelli et al. ........ 375/233 |

OTHER PUBLICATIONS

Brown, J.E. et al., "A 35 Mb/s Mixed-Signal Decision-Feedback Equalizer for Disk Drives in 2-μm CMOS", IEEE Journal of Solid-State Circuits, vol. 31, pp. 1258-1266, Sep. 1996.
Garg, A. et al., "A1-Tap 40-Gb/s Look-Ahead Decision Feedback Equalizer in 0.18-μm SiGe BiCMOS Technology", IEEE Journal of Solid-State Circuits, vol. 41, No. 10, pp. 2224-2232, Oct. 2006.
Ibrahim, S. et al., "A 20Gb/s 40mW Equalizer in 90nm CMOS Technology" IEEE Journal of Solid-State Circuits, pp. 170-172, 2010.
Kajley, R. S. et al., "A Mixed-Signal Decision-Feedback Equalizer That Uses a Look-Ahead Architecture", IEEE Journal of Solid-State Circuits, vol. 32, No. 3, pp. 450-459, Mar. 1997.

* cited by examiner

*Primary Examiner* — Crystal L Hammond
(74) *Attorney, Agent, or Firm* — Ropes & Gray LLP

(57) ABSTRACT

Systems and methods are disclosed for employing an equalization technique that improves equalizer input sensitivity and which reduces power consumption. In particular, an equalization architecture is described that includes a continuous-time linear equalizer and a decision feedback equalizer, each with offset cancellation that enables the equalizer to be used at high data rates. In addition, the equalization structure has a power-saving mode for bypassing the decision feedback equalizer. These offset cancellation and power-saving features are enabled and controlled using programmable logic on a programmable device.

20 Claims, 11 Drawing Sheets

US 8,537,886 B1

RECONFIGURABLE EQUALIZATION ARCHITECTURE FOR HIGH-SPEED RECEIVERS

BACKGROUND OF THE INVENTION

This invention relates to systems and methods for equalizing data using a programmable device—e.g., a field-programmable gate array (FPGA) or other programmable logic device (PLD)—in high speed applications.

Programmable devices are well known. Generally, programmable devices, such as FPGAs, contain receiver or transceiver circuitry for processing and recovering incoming signals. However, the speed of such circuitry is often limited by inter-symbol interference (ISI) due to communication channel bandwidth limitations.

Equalizers are used to compensate for amplitude and phase distortion caused by non-ideal communication channels. Typically, two types of equalizers are used to reduce the effects of inter-symbol interference: a continuous-time linear equalizer (CTLE) and a discrete-time equalizer, the latter of which is often implemented as a decision feedback equalizer (DFE).

A CTLE amplifies high-frequency components of an incoming signal to counteract the channel response, which generally attenuates those high-frequency components. A disadvantage of CTLEs, however, is that they also amplify noise at high frequencies. A DFE is therefore used in conjunction with a CTLE to minimize the effects of noise in the incoming signal, and is optimal for larger loss channels where reflection is also present.

A DFE is a non-linear equalizer that reduces inter-symbol interference without introducing additional noise into the signal. Operating a DFE at high data rates is a challenge, however, due to the demanding time requirements of the digital circuitry in the receiver. For example, DFE input sensitivity is especially important in high speed applications due to the significant channel attenuation, which adversely impacts the timing margin. Proper signal offset cancellation, which improves the DFE's input sensitivity, is therefore critical to achieving higher data rates.

SUMMARY OF THE INVENTION

The present invention relates to a reconfigurable equalization architecture for high-speed receivers. The equalization architecture can, for example, be incorporated into an FPGA manufactured using 28 nm semiconductor technology for use in a 25 Gb/s or 28 Gb/s receiver. The equalization structure may include an integrated CTLE and DFE that provides internal offset cancellation and a power-saving mode for bypassing the DFE.

In accordance with embodiments of the present invention, there is provided a programmable integrated circuit device having a decision feedback equalizer and logic circuitry. The decision feedback equalizer is configured to equalize an input signal and includes at least a summer circuit, two transistors, a resistor, and two current sources. The transistors are arranged as a differential pair and are configured to receive a differential input signal. The resistor is disposed between the transistors and is configured to provide resistor degeneration in the differential pair. The current sources are disposed at either end of the resistor and each provide signal offset cancellation. The logic circuitry is configured to control the current generated by the current sources based on stored calibration data.

In accordance with additional embodiments of the present invention, the logic circuitry is further configured to monitor an output of the summer circuit while varying a control signal that controls the current sources. The logic circuitry is also configured to detect a minimal level of offset in the output based on the monitoring, and to store an indication of the control signal as part of the calibration data when the minimal level of offset is detected.

In accordance with additional embodiments of the present invention, the summer circuit includes a second differential pair of transistors, a third current source, and two switches. The second differential pair of transistors receives a differential feedback signal. The third current source is disposed at a node connecting the two transistors and is configured to receive a second control signal that controls the third current source. The first switch is disposed between the third current source and the logic circuitry, while the second switch is disposed between the third current source and a low voltage. The logic circuitry is further configured to generate the second control signal and to control the switches (e.g., to open and close the switches depending on a mode). In some embodiments, the decision feedback equalizer also includes a third switch disposed between the summer circuit and a voltage source, and the logic circuitry is further configured to control the third switch.

In accordance with additional embodiments of the present invention, the decision feedback equalizer includes a second summer circuit, a stacked multiplexer, and two delay blocks. The second summer circuit is configured to sum the input signal with a multiple signals. The stacked multiplexer is configured to receive two internal signals (one from each summer circuit), two delayed output signals, and a clock signal, and to select one of the two internal signals for output. The delay blocks are configured to receive the output of the stacked multiplexer and to output the delayed output signals.

In accordance with additional embodiments of the present invention, the decision feedback equalizer also includes two additional delay blocks and a multiplexer. The additional delay blocks are configured to receive the output of the stacked multiplexer and to output two additional delayed output signals. The multiplexer is configured to receive those delayed output signals from the additional delay blocks and to provide one of the signals to the summer circuits. In some embodiments, the logic circuitry is further configured to control multiple switches disposed within the summer circuits, the stacked multiplexer, the delay blocks, and/or the multiplexer.

In accordance with additional embodiments of the present invention, the logic circuitry is further configured to determine whether the decision feedback equalizer is in a first mode or a second mode. In addition, when the decision feedback equalizer is in the first mode, the logic circuitry is configured to: (a) disable, using the switches, the second summer circuit, the delay blocks, and/or the multiplexer, and (b) configure, using the switches, the stacked multiplexer to select the first internal signal (e.g., high path signal) for output. When the decision feedback equalizer is in the second mode, the logic circuitry is configured to: (a) enable, using the switches, the second summer circuit, the delay blocks and/or the multiplexer, and (b) configure, using the switches, the stacked multiplexer to select one of the internal signals for output depending on the first two delayed output signals.

In accordance with embodiments of the present invention, there is provided a programmable integrated circuit device having a continuous time linear equalizer, a decision feedback equalizer with a high path and a low path, and logic circuitry. The continuous time linear equalizer is configured to equalize an input signal. The decision feedback equalizer is configured to receive that equalized input signal and to provide an output signal. The logic circuitry configured to determine whether the decision feedback equalizer is in a bypass mode and, in response to determining that the decision feedback equalizer is in the bypass mode, (a) disable the low path and (b) provide, using the high path, the equalized input signal as the output signal.

Methods of configuring and operating the above-described programmable integrated circuit devices are also provided.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION OF THE INVENTION

Systems and methods are described herein for employing an equalization technique that improves equalizer input sensitivity and which reduces power consumption. These features are realized, in an exemplary embodiment, through implementation of an equalization structure with offset cancellation and bypass functions. In particular, an equalization architecture is described herein that includes a continuous-time linear equalizer (CTLE) and a decision feedback equalizer (DFE), each with offset cancellation that enables the equalizer to be used at high data rates. In addition, the equalization structure has a power-saving mode for bypassing the DFE. The equalization architecture can be incorporated, for example, into an FPGA manufactured using 28 nm semiconductor technology for use in a 25 Gb/s or 28 GB/s receiver.

The offset cancellation function enables operation at high data rates even when the incoming signals have significant signal offset (e.g., due to process variations and mismatch). As such, the bit error rate (BER) of the receiver can be improved at high speeds without incurring a power penalty. The bypass function allows a programmable device to configure the equalizer to use the CTLE only, bypassing the DFE. Hence, the equalizer can save power when the DFE is not needed. Moreover, with added control logic in the programmable device, the equalization structure of the present invention is compatible with existing receiver circuitry, including existing CTLEs and clock data recovery (CDR) circuits.

Figure 1:
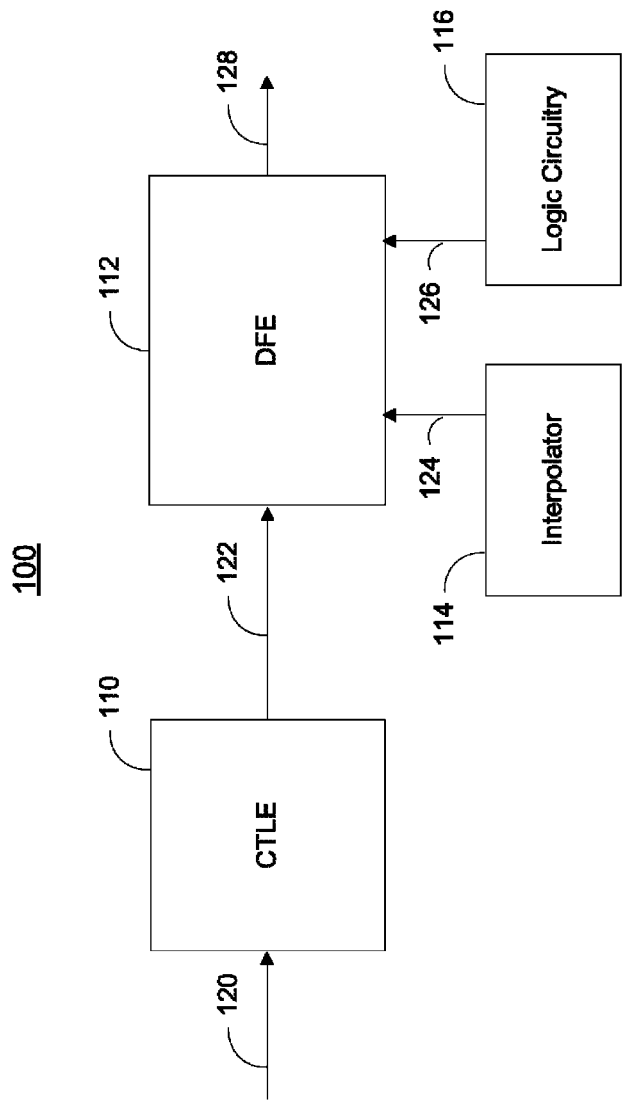
FIG. 1 depicts a block diagram of a programmable logic device with equalization circuitry, according to an illustrative embodiment of the present invention.

FIG. 1 shows illustrative device 100 that includes CTLE 110, DFE 112, interpolator 114, and logic circuitry 116 in accordance with some embodiments of the present invention. Logic circuitry 116 may be part of a programmable logic core that can be configured according to configuration data that is programmed by a user. In an embodiment, logic circuitry 116 is programmed to configure DFE 112. For example, logic circuitry 116 may configure DFE 112 to operate in at least four modes. In a first mode, hereinafter "normal mode," DFE 112 receives signals 122 from CTLE 110, equalizes the signals, and outputs equalized signals 128. In an embodiment, the equalized signals may be provided to a clock and data recovery (CDR) circuit. DFE 112 may include a number of variable components and, in normal mode, these variable components may be configured by logic circuitry 116. The composition of DFE 112 and the configuration of its variable components are described further below in connection with FIGS. 2-11.

In a second mode, hereinafter "bypass mode," DFE 112 is configured to pass incoming signals to the output without processing the signals, i.e., bypassing the DFE equalization function. In particular, DFE 112 receives signals 122 from CTLE 110 and outputs the signals, unchanged, as signals 128. In bypass mode, logic circuitry 116 is programmed to turn off certain components of DFE 112, as described further below in connection with FIGS. 6 and 9.

In an embodiment, DFE 112 includes two parallel paths, a "high path" and a "low path," respectively. As used herein, the high path denotes a signal path in which it is assumed that the previous input signal (i.e., a once-delayed input signal) has a high value (i.e., a value of 1), while the low path denotes a signal path in which it is assumed that the previous input signal has a low value (i.e., a value of −1). In a third mode, hereinafter "high path calibration mode," DFE 112 is configured to disable the low path, thereby enabling the high path to be calibrated independently of the low path. In a fourth mode, hereinafter "low path calibration mode," DFE 112 is configured to disable the high path, thereby enabling the low path to be calibrated independently of the high path. In the calibration modes, logic circuitry 116 is programmed to turn off certain components of DFE 112, as described further below in connection with FIGS. 6, 10 and 11.

Returning to FIG. 1, incoming signals 120 are received by CTLE 110, which outputs equalized signals 122. In an embodiment, CTLE 110 may be a three-stage linear equalizer. CTLE 110 may also include its own internal offset cancellation and, in some embodiments, may be configured by signals 126 output by logic circuitry 116. DFE 112, which may be directly connected to CTLE 110, receives signals 122 and outputs signals 128, which may be further equalized when DFE 112 is in normal mode. Signals 128 may be provided to other receiver circuitry, e.g., a CDR circuit.

DFE 112 may be configured by signals 126 output by logic circuitry 116. Specifically, as discussed below, control signals 126 may enable, disable, and/or configure various components within DFE 112, including variable current sources and switches. In addition, DFE 112 may receive clock signals from interpolator 114, which may be, for example, a 32-phase or 64-phase interpolator. In an embodiment, DFE 112, as described in greater detail below, may be a two-tap look-ahead DFE.

In an exemplary embodiment, device 100 is an FPGA; however, device 100 may be any other suitable form of a circuitry. For example, device 100 may be an application-specific integrated circuit (ASIC), a complex programmable logic device (CPLD), or any other suitable programmable logic device. It should also be understood that device 100 may be a combination of devices, such as an FPGA and an ASIC, and/or may include additional, standalone circuit components. For instance, CTLE 110, DFE 112, and/or interpolator 114 may be included within an FPGA that also includes logic circuitry 116. Alternatively, CTLE 110, DFE 112, and/or interpolator 114 may be part of a separate ASIC, or may be composed of discrete circuit components coupled to logic circuitry 116.

Figure 2:
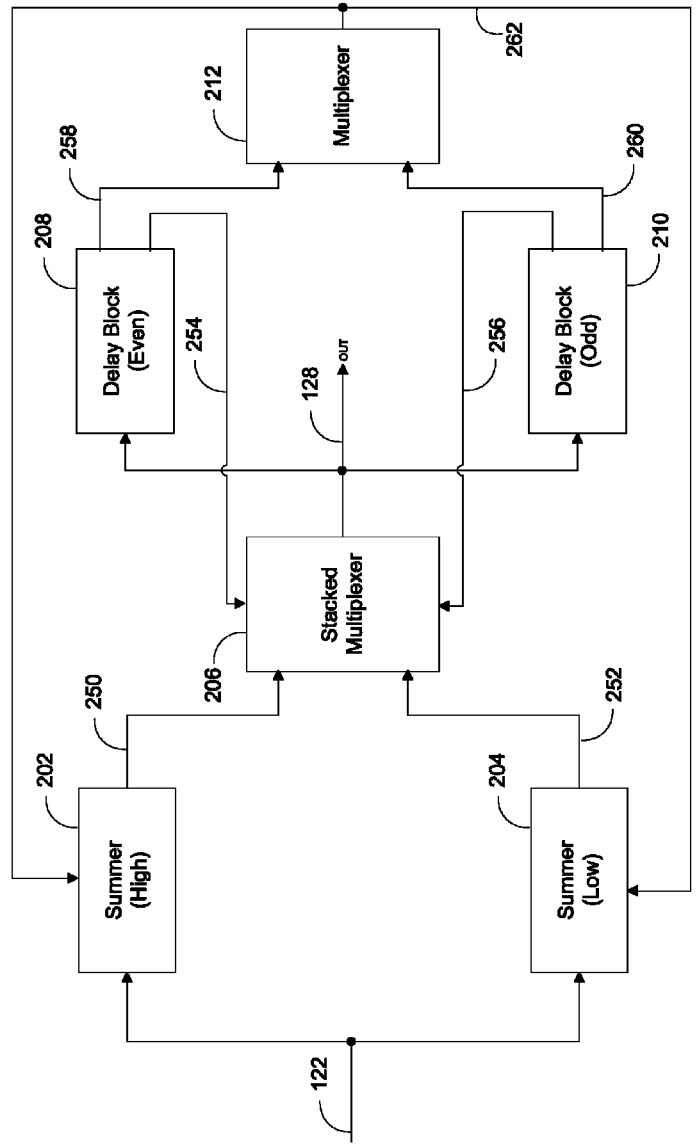
FIG. 2 depicts a detailed block diagram of the decision feedback equalizer of FIG. 1, according to an illustrative embodiment of the present invention.

FIG. 2 depicts the major functional blocks of DFE 112 of FIG. 1, in accordance with some embodiments of the present invention. In particular, FIG. 2 shows illustrative DFE 200, which may be substantially similar to DFE 112 of FIG. 1. As shown, DFE 200 may include summers 202 and 204, multiplexers 206 and 212, and delay blocks 208 and 210. In an embodiment, the signal path including summer 202 corresponds to the DFE high path while the signal path including summer 204 corresponds to the DFE low path. As discussed above, the high path denotes a signal path in which it is assumed that the previous input signal (i.e., a once-delayed input signal) has a high value (i.e., a value of 1), while the low path denotes a signal path in which it is assumed that the previous input signal has a low value (i.e., a value of −1).

Summers 202 and 204 each receive signals 122 output by CTLE 110 of FIG. 1. In an embodiment, CTLE 110 splits the output signals 122 and provides separate inputs to summer 202 and summer 204, respectively. Summers 202 and 204 may each sum the incoming signals 122 with a feedback signal 262. In an embodiment, feedback signal 262 is an equalized version of a once-delayed input signal. In addition to the input signal 122 and feedback signal 262, summer 202 may additionally sum a signal corresponding to a high value. Conversely, in addition to the input signal 122 and feedback signal 262, summer 204 may additionally sum a signal corresponding to a low value. It should be understood that summers 202 and 204 may perform a weighted summation function, in which each signal is scaled differently.

Summers 202 and 204 may respectively output signals 250 and 252 to multiplexer 206.

Multiplexer 206, in turn, selects one of signals 250 and 252 to provide as output signal 128, which is provided to delay blocks 208 and 210, as well as to output circuitry, such as a CDR circuit. In an embodiment, multiplexer 206 is a stacked multiplexer that performs the function of two serial multiplexers. In particular, in addition to signals 250 and 252, multiplexer 206 may also receive signals 254 and 256 from delay blocks 208 and 210, respectively, and a clock signal. Each of these signals may be used to determine the output 128. In other words, multiplexer 206 may select signal 250 or signal 252 for output depending on the clock signal value as well as the values of signals 254 and 256. Thus, multiplexer 206 is partially controlled by its own previous (i.e., delayed) output. The structure of multiplexer 206 and its operation are discussed in greater detail below in connection with FIG. 4.

In an embodiment, the signal path including delay block 208 corresponds to an "even clock path" while the signal path including delay block 210 corresponds to an "odd clock path." As used herein, the even clock path denotes a signal path in which a new value is stored each time the clock transitions high, while the odd clock path denotes a signal path in which a new value is stored each time the clock transitions low. In other words, delay block 208 and delay block 210 operate on an alternating basis, depending on the signal value of the clock signal. In an embodiment, when the clock transitions to a high value (i.e., at time T), the current value of output signal 128 is stored in delay block 208, while the value of output signal 128 when the clock was previously high (i.e., at time T−1) is output from delay block 208 as signal 258 to multiplexer 212. Likewise, when the clock transitions to a low value (i.e., at time T'), the current value of output signal 128 is stored in delay block 210, while the value of output signal 128 when the clock was previously low (i.e., at time T'−1) is output from delay block 210 as signal 260 to multiplexer 212. Thus, delay blocks 208 and 210 work in tandem to input and output signals whenever the clock signal transitions high or low.

Referring again to FIG. 2, multiplexer 206 provides output 128 to subsequent circuitry as well as to delay blocks 208 and 210. Delay block 208 provides a delayed signal 254 to multiplexer 206 and a delayed signal 258 to multiplexer 212. Delay block 210 likewise provides a delayed signal 256 to multiplexer 206 and a delayed signal 260 to multiplexer 212. Multiplexer 212, in turn, may provide feedback signal 262 to summers 202 and 204.

Multiplexer 212 may alternatingly provide signal 258 and signal 260 as feedback signal 262, depending on whether the clock is high or low. Accordingly, delay blocks 208 and 210, together with multiplexer 212, may input and output values (i.e., delayed versions of output signals 128) twice as fast as each individual delay block operates. Of course, it should be understood that in another embodiment, a single delay block may be substituted for delay blocks 208 and 210, provided the delay block operates at a speed sufficient for the desired data rate. In such an embodiment, multiplexer 212 would be unnecessary.

Feedback signal 262, which is provided to summers 202 and 204 represents previous decisions of DFE 200. Thus, it should be understood that summers 202 and 204, in combination with multiplexer 206, use previous DFE decisions to predict the value of current incoming signal 122.

Specifically, ISI attributable to previous incoming signals, as reflected by feedback signal 262, is removed from incoming signal 122 using summers 202 and 204.

Crucial to high speed operation of DFE 200 is improved input sensitivity. Therefore, DFE 200, and in particular, summers 202 and 204 provide robust signal offset cancellation. Summers 202 and 204 may be calibrated separately, as described further below, to provide optimal offset cancellation for incoming signal 122 in both the high path and the low path of DFE 200. DFE 200 may also include bypass functionality, allowing input signal 122 to be provided, without modification, to the output as signal 128. The bypass functionality may allow certain portions of DFE 200 to be powered off, thereby reducing total power consumption in the circuit. In an exemplary embodiment, input signal 122 is passed directly through summer 202 and multiplexer 206 to output 128. Summers 204, delay blocks 208 and 210, and multiplexer 212 are not used and may therefore be powered off to reduce power consumption in DFE 200. The offset cancellation and bypass features may be configured and controlled using programmable logic on the programmable device (e.g., logic circuitry 116 of FIG. 1). Accordingly, programmable logic may provide control signals to any or all of the components of DFE 200 in order to implement these features.

Figure 3:
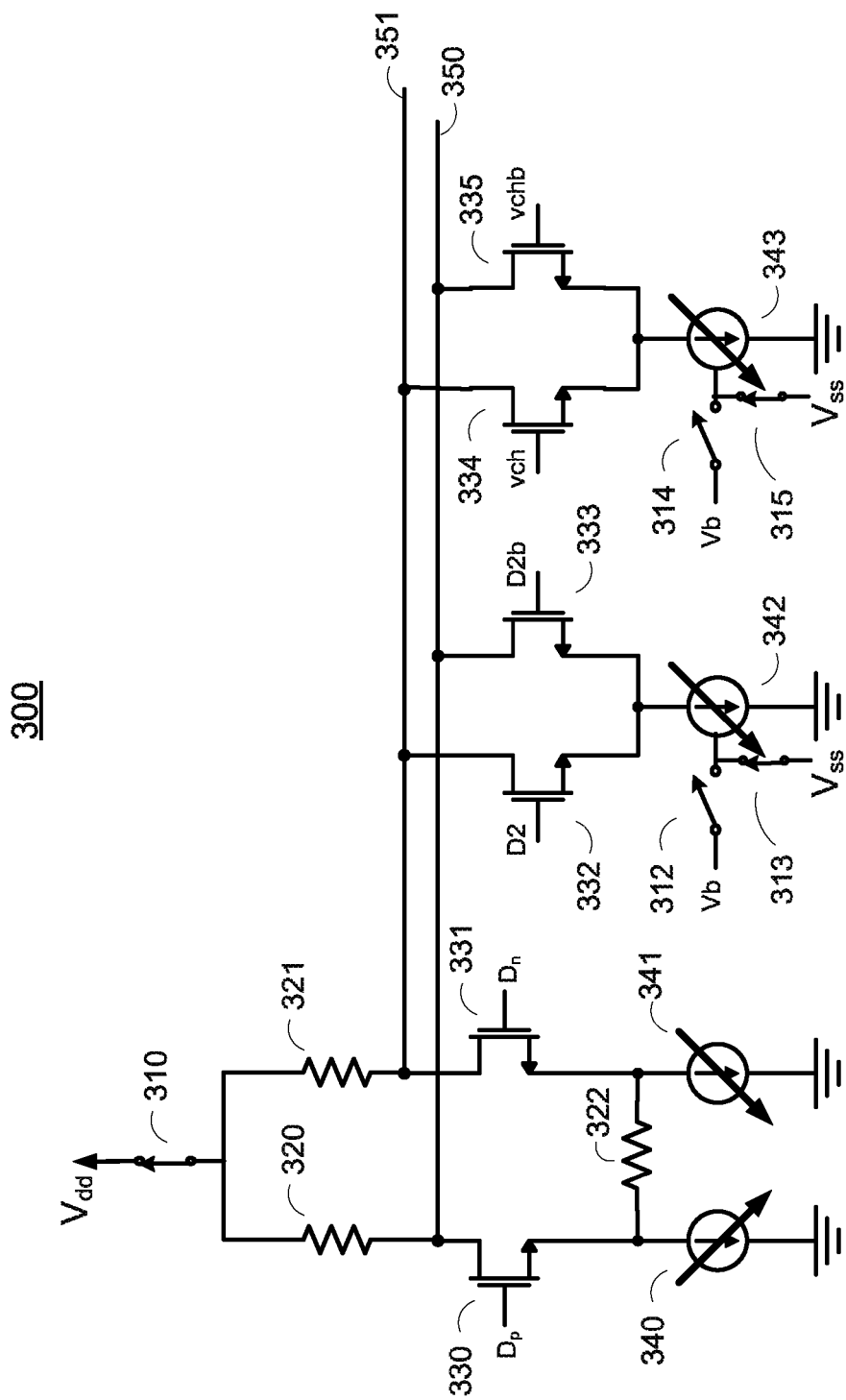
FIG. 3 depicts an exemplary implementation of the summer circuitry of FIG. 2, according to an illustrative embodiment of the present invention.

FIG. 3 depicts an exemplary implementation of summers 202 and 204 of FIG. 2, in accordance with some embodiments of the present invention. In particular, FIG. 3 shows illustrative summer 300, which may be substantially similar to summers 202 and 204 of FIG. 2.

As shown, summer 300 may be a three stage differential current summing circuit. Although depicted as a single line, it should be understood that any or all signals depicted in FIGS. 1 and 2, may be differential signals (i.e., a signal accompanied by its complementary value) so as to enable operation using differential circuits. Transistors 330 and 331 form a first differential pair that receives the incoming signal, e.g., input signal 122 of FIG. 1. Specifically, each transistor receives a respective one of the complementary inputs at a first terminal (also referred to herein as an "input terminal"). Transistors 330 and 331 may be connected, at their respective second terminals, to voltage high (Vdd) through resistors 320 and 321, respectively, as well as switch 310. In normal operating mode, i.e., when summer 300 is operative, switch 310 is closed. Transistors 330 and 331 may also be connected, at their respective second terminals, to the other differential pairs depicted, as well as to outputs 350 and 351, respectively. Finally, transistors 330 and 331 may be connected, at their respective third terminals, to resistor 322 and variable current sources 340 and 341, as shown.

Resistor 322 provides resistor degeneration in the input differential pair, thereby enabling offset cancellation directly at the summing current sources 340 and 341. In particular, disposing resistor 322 between the differential pair, as shown, avoids the need to apply offset cancellation at the high-speed signals, which loads the input and adversely impacts timing margins. Thus, summer circuit 300 exhibits improved input sensitivity, which is necessary for operating the receiver at high speeds.

Variable current sources 340 and 341 are configured to provide optimal offset cancellation. As such, the current sources may be controlled by the programmable logic based on stored calibration data. Calibrating the offset cancellation of summer circuit 300 will be discussed further below in connection with FIGS. 6, 10 and 11. In an exemplary embodiment, both sources 340 and 341 are controlled by programmable logic to provide the same amount of current, e.g., their scaling factors may be set to the same value.

Transistors 332 and 333 form a second differential pair that receives the feedback signal, e.g., feedback signal 262 of FIG. 2. Specifically, each transistor receives a respective one of the complementary feedback signals at a first terminal. Transistors 332 and 333 may be connected, at their respective second terminals, to voltage source Vdd through resistors 320 and 321, respectively, as well as switch 310. Transistors 332 and 333 may also be connected, at their respective second terminals, to the other differential pairs depicted, as well as to outputs 351 and 350, respectively. Finally, transistors 332 and 333 may be connected, at their respective third terminals, to variable current source 342, as shown.

Variable current source 342 may be controlled by programmable logic, which may, for instance, set a control voltage (Vb) for the current source. In an embodiment, as shown, variable current source 342 may be connected to this control voltage through switch 312. Variable current source 342 may also, in some configurations, be connected to voltage low (Vss) through switch 313. In normal operating mode, switch 312 is closed and switch 313 is open, and thus variable current source 342 is directly controllable by the programmable logic device. In bypass mode, on the other hand, switch 312 is opened and switch 313 is closed, so that the current source control voltage is set to voltage low (Vss) and thereby turned off. Switches 312 and 313 may be configured (i.e., opened and closed) by the programmable logic according to the desired mode.

Transistors 334 and 335 form a third differential pair that produce a current indicative of the assumed value of the previous input signal. Accordingly, the configuration of these transistors depends on the location of summer 300 in the DFE. When summer 300 is disposed in the high path (i.e., as summer 202 of FIG. 2), the assumed value is a high value, and the first terminal of transistor 334 is tied to voltage high while the first terminal of transistor 335 is tied to voltage low. On the other hand, when summer 300 is disposed in the low path (i.e., as summer 204 of FIG. 2), the assumed value is a low value, and the first terminal of transistor 334 is tied to voltage low while the first terminal of transistor 335 is tied to voltage high. Thus, the third differential pair generates current indicative of opposite values depending on the DFE path the summer circuit is located in. The third differential pair operates to cancel post-cursor ISI.

Transistors 334 and 335 may be connected, at their respective second terminals, to voltage source Vdd through resistors 320 and 321, respectively, as well as switch 310. Transistors 334 and 335 may also be connected, at their respective second terminals, to the other differential pairs depicted, as well as to outputs 351 and 350, respectively. Finally, transistors 334 and 335 may be connected, at their respective third terminals, to variable current source 343, as shown.

Variable current source 343 may be controlled by programmable logic, which may, for instance, set a control voltage (Vb) for the current source. In an embodiment, variable current source 343 may be connected to the control voltage generated by the programmable logic through switch 314 (as shown). Variable current source 343 may also, in some configurations, be connected to switch 315. In normal operating mode, switch 314 is closed and switch 315 is open, and thus variable current source 343 is directly controllable by the programmable logic device. In bypass mode, however, switch 314 is opened and switch 315 is closed, so that the current source control voltage is set to voltage low (Vss) and thereby turned off. Switches 314 and 315 may each be configurable by the programming logic on the programmable device.

As discussed above, in high path calibration mode, DFE 112 is configured to disable the low path, thereby enabling the high path to be calibrated independently of the low path. The low path may be disabled by opening switch 310 of summer 204.

Similarly, in low path calibration mode, the high path may be disabled by opening switch 310 of summer 202. Switch 310 of summers 202 and 204 may be controlled (i.e., opened or closed) by logic circuitry 116 of FIG. 1.

In one approach, the inputs to transistors 332 and 333, as well as transistors 334 and 335, are set to the same voltage level (either voltage high or low) in bypass mode and/or in high and low calibration modes. In some embodiments, additional switches may be provided in summer 300 to provide this functionality. For instance, two additional switches may be provided for each of transistors 334 and 335: one disposed between the input terminal of the respective transistor and high voltage (Vdd) and one disposed between the input terminal of the respective transistor and low voltage (Vss). In normal mode, when summer 300 is disposed in the high path, the switches are configured so that transistor 334 is connected to voltage high and transistor 335 is connected to voltage low; when summer 300 is disposed in the low path, the switches are configured so that transistor 334 is connected to voltage low and transistor 335 is connected to voltage high. In the other modes, on the other hand, the switches are configured so that transistors 334 and 335 are both connected to voltage high or voltage low. In a further embodiment, additional switches may also connect the inputs of transistors 332 and 333 to voltage high and/or voltage low. In normal mode, these switches are opened and each transistor receives a feedback signal (e.g., from multiplexer 608 of FIG. 6). In the other modes, on the other hand, the switches are configured to connect both of the transistors to voltage high or voltage low. In an alternative embodiment, the inputs of transistors 332 and 333 are set to the same voltage without necessitating additional switches in summer 300. For instance, with reference to FIG. 6, multiplexer 608 may be configured to output a high or low voltage signal (for both differential signals), thereby setting each input terminal to the same voltage.

Figure 4:
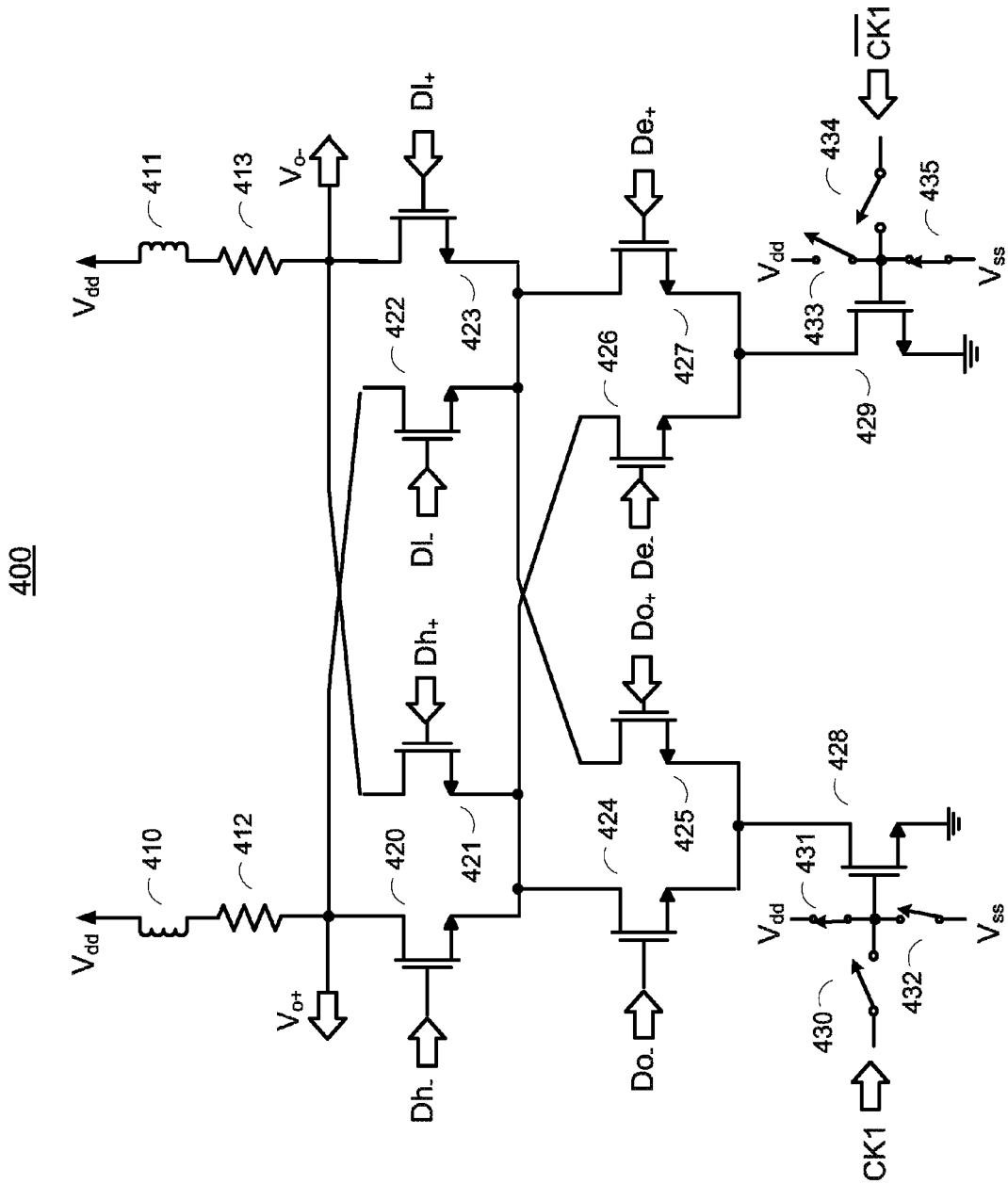
FIG. 4 depicts an exemplary implementation of the stacked multiplexer of FIG. 2, according to an illustrative embodiment of the present invention.

FIG. 4 depicts an exemplary implementation of multiplexer 206 of FIG. 2, in accordance with some embodiments of the present invention. In particular, FIG. 4 shows illustrative multiplexer 400, which may be substantially similar to multiplexer 206 of FIG. 2. Multiplexer 400 may be a stacked multiplexer, configured to receive four sets of input signals in addition to the selection signal. For example, multiplexer 400 may receive the differential outputs of summer 202, summer 204, delay block 208, and delay block 210 of FIG. 2, as well as the clock signal and its complement. The output of multiplexer 400 may depend on the value of each of these input signals.

As shown, multiplexer 400 may include inductors 410 and 411, resistors 412 and 413, transistors 420-429, and switches 430-435.

Transistors 420 and 421 receive the output of the DFE high path (i.e., signal 250 of FIG. 2 and its complement) at their respective first terminals, while transistors 422 and 423 receive the output of the DFE low path (i.e., signal 252 of FIG. 2 and its complement) at their respective first terminals. The respective second terminals of transistors 420 and 422 are connected, forming an output node. Transistors 420 and 422 are also connected, at their respective second terminals, to voltage high (Vdd) through inductor 410 and resistor 412. The respective second terminals of transistors 421 and 423 are connected, forming a complementary output node. Transistors 421 and 423 are also connected, at their respective second terminals, to voltage high (Vdd) through inductor 411 and resistor 413. The respective third terminals of transistors 420 and 421 are connected to each other and to transistors 424 and 426. The respective third terminals of transistors 422 and 423 are connected to each other and to transistors 425 and 427.

Transistors 424 and 425 receive the output of the odd clock path (i.e., signal 256 of FIG. 2 and its complement) at their respective first terminals, while transistors 426 and 427 receive the output of the even clock path (i.e., signal 254 of FIG. 2 and its complement) at their respective first terminals. The respective second terminals of transistors 424 and 426 are connected to the third terminals of transistors 420 and 421. The respective second terminals of transistors 425 and 427 are connected to the third terminals of transistors 422 and 423. The respective third terminals of transistors 424 and 425 are connected to each other and to transistor 428. The respective third terminals of transistors 426 and 427 are connected to each other and to transistor 429.

In normal mode, transistor 428 receives the clock signal (i.e., signal 124 of FIG. 2) at its first terminal through switch 430. In other modes, transistor 428 may be connected, at its first terminal, to high voltage (Vdd) through switch 431 or low voltage (Vss) through switch 432. Transistor 428 is also connected to transistors 424 and 425 at its second terminal and to ground (or low voltage) at its third terminal. Furthermore, in normal mode, transistor 429 receives the complementary clock signal (i.e., the complement of signal 124 of FIG. 2) at its first terminal through switch 434. In other modes, transistor 429 may be connected, at its first terminal, to high voltage (Vdd) through switch 433 or low voltage (Vss) through switch 435. Transistor 429 is also connected to transistors 426 and 427 at its second terminal and to ground (or low voltage) at its third terminal.

In normal mode, switches 430 and 434 are closed while switches 431, 432, 433 and 435 are open. Accordingly, transistors 428 and 429 are controlled by the clock signal: when the clock signal is high, transistor 428 is turned on and transistor 429 is turned off; conversely, when the clock signal is low, transistor 428 is turned off and transistor 429 is turned on. Furthermore, when transistor 428 is off, transistors 424 and 425 are turned off as well, and the output signals are controlled by the values at the inputs of transistors 426 and 427, which correspond to the even clock path. Similarly, when transistor 429 is off, transistors 426 and 427 are turned off, and the output signals are controlled by the values at the inputs of transistor 424 and 425.

Therefore, when the clock is high, the multiplexer outputs complementary signals (Vo+ and Vo−) corresponding to the differential inputs to transistors 420 and 421 (i.e., the high path output signals) or 422 and 423 (i.e., the low path output signals), depending on the value of the differential inputs to transistors 424 and 425, which act as the multiplexer selection signals. The differential inputs to transistors 424 and 425 (which are the differential outputs of the odd clock path) determine whether the high path or the low path is selected. Similarly, when the clock is low, the multiplexer outputs complementary signals (Vo+ and Vo−) corresponding to the differential inputs to transistors 420 and 421 (i.e., the high path output signals) or 422 and 423 (i.e., the low path output signals), depending on the value of the differential inputs to transistors 426 and 427, which act as the multiplexer selection signals. The differential inputs to transistors 426 and 427 (which are the differential outputs of the even clock path) determine whether the high path or the low path is selected. Regardless of the clock value, when the low path is selected, the multiplexer outputs the values of the differential inputs to transistors 420 and 421. Conversely, when the high path is selected, the multiplexer outputs the values of the differential inputs to transistors 422 and 423.

The structure of the stacked multiplexer 400, which receives input from the even and odd delay paths, therefore operates at twice the speed of each delay path taken individually. This increase in speed is due to the fact that each clock transition leads to a switch in which input signals—from the even path or the odd path—operate as the selection signals for the multiplexer. Specifically, the source of the selection signals vacillates (with the clock) between the even path and the odd path. In either case, previous values of the DFE output (i.e., the output of the even or odd paths) controls whether the output of the DFE high path or the output of the DFE low path is selected as the DFE output corresponding to the incoming signal.

In bypass mode, switches 431 and 435 are closed while switches 430, 432, 433, and 434 are open. Thus, transistor 428 is turned on and transistor 429 is turned off, regardless of the clock signal value. Since transistor 429 is turned off, transistors 426 and 427 are also turned off, and the signals at their inputs are immaterial. Alternatively, in some embodiments, the inputs to transistors 426 and 427 are set to the same voltage level (either voltage high or low). For instance, with reference to FIG. 6, latch 610 may be configured to output a high voltage signal (for both differential signals) and latch 613 may be configured to output a low voltage signal (for both differential signals). The input signals for transistors 422 and 423 are set to voltage low, thus turning them off as well and effectively disabling transistor 425. Accordingly, in bypass mode, the only enabled transistors are transistors 420, 421, 424, and 428, the latter two of which are maintained in the active state. Multiplexer 400 therefore simply outputs the values at the inputs of transistors 420 and 421, i.e., the outputs of the DFE high path.

Multiplexer 400 is configured the same way in high path calibration mode. That is, switches 431 and 435 are closed while switches 430, 432, 433, and 434 are open. The input signals for transistors 422 and 423 are set to voltage low, while the input for transistor 424 is maintained at voltage high. However, unlike bypass mode, the inputs at transistors 420 and 421 are also maintained at high voltage. In addition, in some embodiments, the inputs to transistors 426 and 427 are set to the same voltage level (either voltage high or low). In low path calibration mode, switches 431 and 435 are closed while switches 430, 432, 433, and 434 are open. The input signals for transistors 420 and 421 are set to voltage low, while the input for transistor 425 is maintained at voltage high. The inputs at transistors 422 and 423 are also maintained at high voltage. In addition, in some embodiments, the inputs to transistors 424 and 425 are set to the same voltage level (either voltage high or low). For instance, with reference to FIG. 6, latches 610 and 613 may each be configured to output a high voltage signal (for both differential signals) when in high or low path calibration modes.

It should be understood that other configurations of multiplexer 400 for the four modes are possible. For example, both of transistors 428 and 429 may be connected to voltage high (Vdd) in bypass mode and/or in the calibration modes. In addition, transistor 426 may be maintained active in bypass and high path calibration modes, while transistor 427 may be maintained active in low path calibration mode. In an embodiment, multiplexer 400 does not include switches 432 and 435, and transistors 428 and 429 are either connected to the clock signals (in normal mode) or to voltage high (in the other modes).

Figure 5:
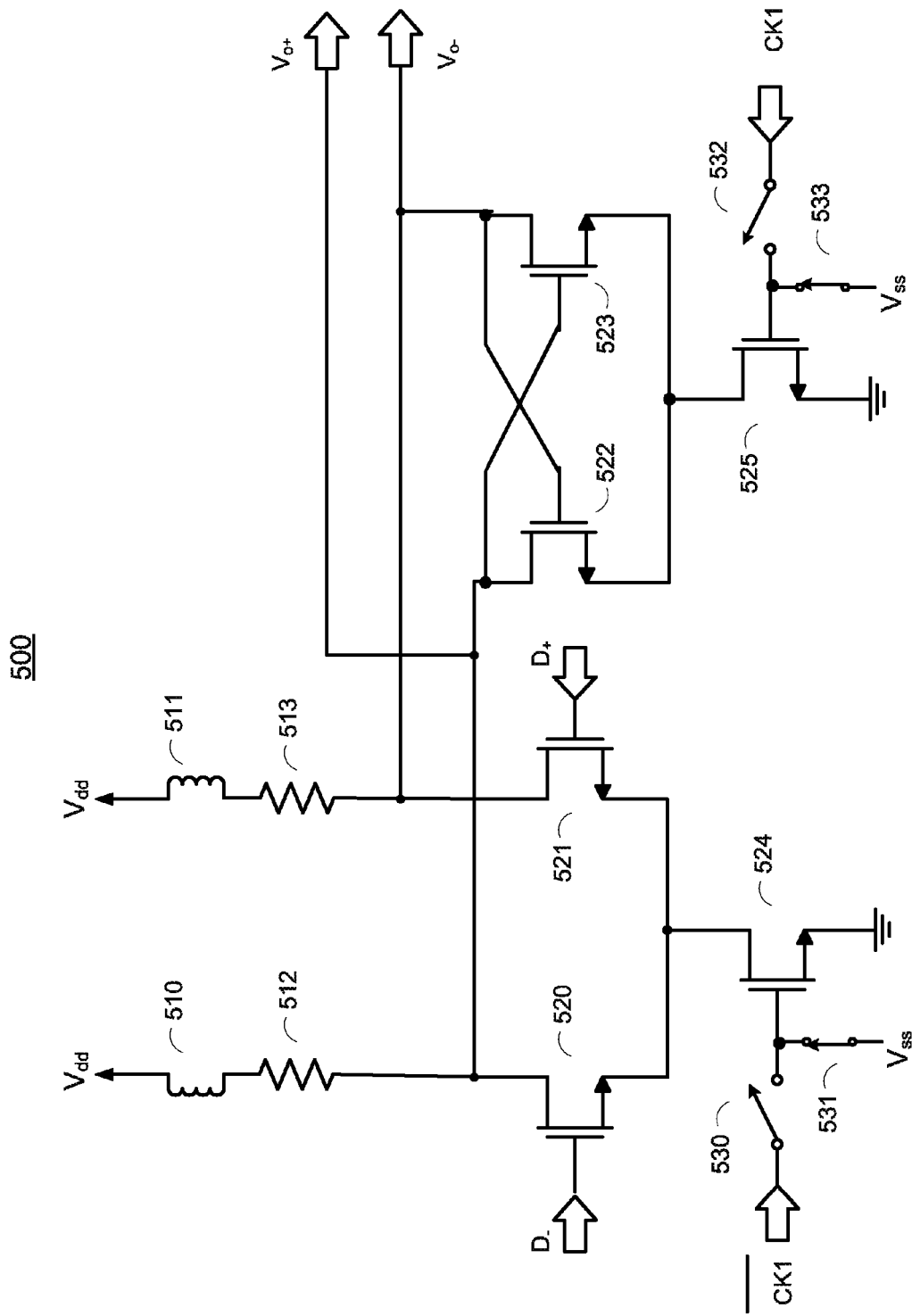
FIG. 5 depicts an exemplary implementation of a latch circuit in the delay block of FIG. 2, according to an illustrative embodiment of the present invention.

FIG. 5 depicts an exemplary implementation of a latch that may be implemented as part of delay block 208 or 210 of FIG. 2, in accordance with some embodiments of the present invention. Latch 500 may include inductors 510 and 511, resistors 512 and 513, transistors 520-525, and switches 530-533.

Transistors 520 and 521 form a first differential pair, their respective first terminals receiving complementary input signals. A second terminal of transistor 520 is connected to voltage high (Vdd) through resistor 512 and inductor 510, while a second terminal of transistor 521 is connected to voltage high through resistor 513 and inductor 511, respectively. The respective second terminals of each transistor are also connected to transistors 522 and 523, and provide the output signals (Vo+ and Vo−). The third terminals of transistors 520 and 521 are connected to each other and to transistor 524.

The input terminal of transistor 524 is connected, in normal mode, to the complementary clock signal through switch 530. Alternatively, when not in normal mode, the input terminal of transistor 524 may be connected to voltage low (Vss) through switch 531. The second terminal of transistor 524 is connected to the third terminals of transistors 520 and 521. The third terminal of transistor 524 is connected to ground (or voltage low). Thus, in normal mode, transistor 524 becomes active when the clock signal is low, thereby enabling transistors 520 and 521, which output differential signals equivalent to the incoming signals.

The input terminals of transistors 522 and 523 are cross-connected to each other's second terminals, which are also the nodes at which power and the output signals are provided (as shown). In addition, the third terminals of transistors 522 and 523 are connected to each other and to transistor 525. The input terminal of transistor 525 is connected, in normal mode, to the clock signal through switch 532. In other modes, the input terminal of transistor 525 may be connected to voltage low (Vss) through switch 533. The first terminal of transistor 525 is connected to the third terminals of transistors 522 and 523, and its third terminal is connected to ground (or voltage low). Thus, in normal mode, transistor 525 is activated each time the clock is high, thereby activating transistors 522 and 523, which provide the latch output signals.

Accordingly, in normal mode, latch 500 receives and stores the incoming signal value when the clock in low, and provides that value at the outputs when the clock is high. Of course, it should be understood that the clock signals may be reversed and latch 500 may receive and store the incoming signal value when the clock in high, and provide that value at the outputs when the clock is low. In bypass mode and/or the offset calibration modes, switches 531 and 533 may be closed, and switches 530 and 532 may be opened, thereby disabling both transistors 524 and 525. Hence, in these modes, latch 500 may be completely disabled, reducing power consumption in the DFE. It should be understood that, in other approaches, transistors 524 and 525 are maintained active in the offset calibration modes, to enable compensation for the loading effects of the latch.

Figure 6:
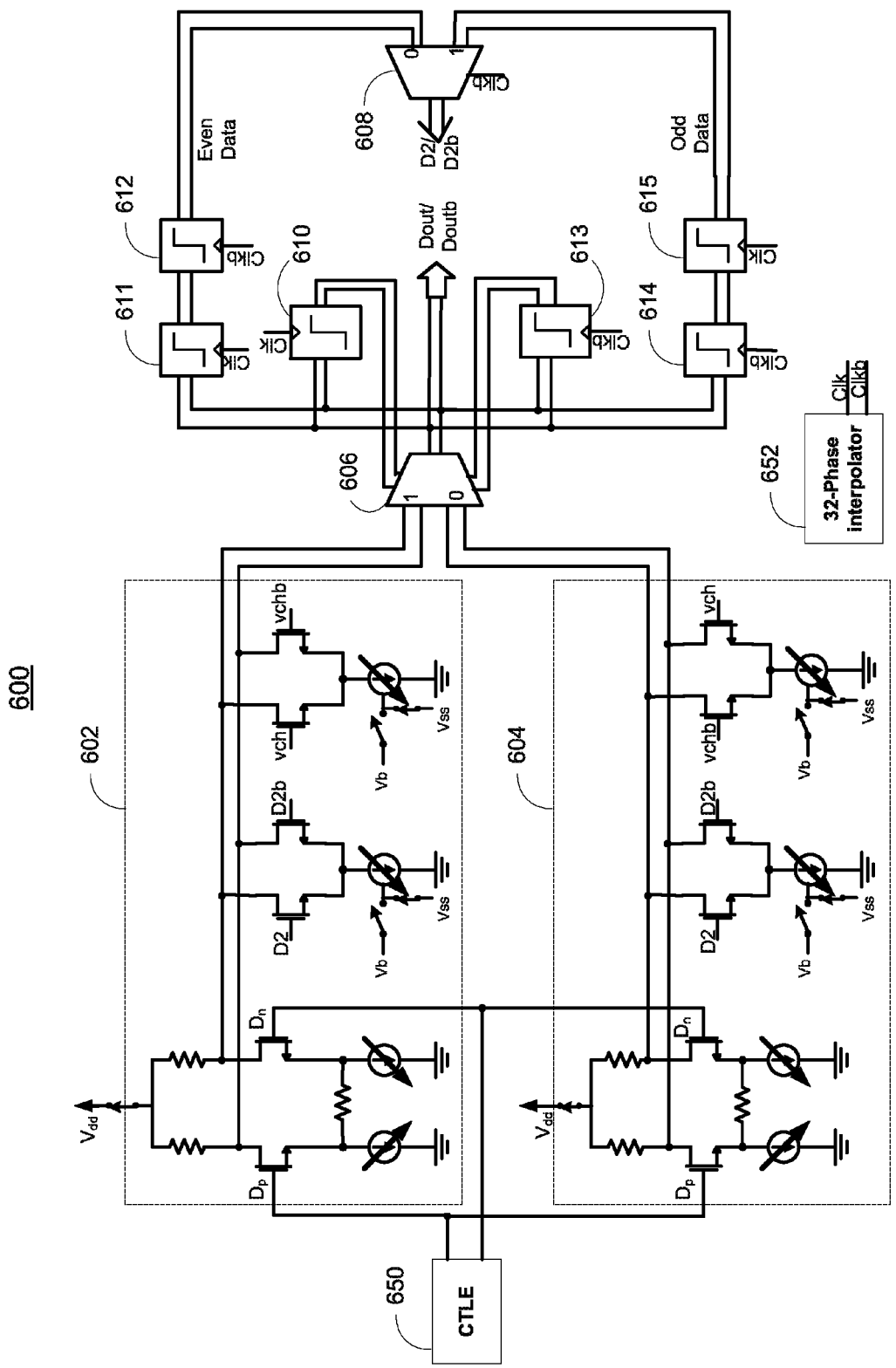
FIG. 6 depicts an exemplary implementation of the decision feedback equalizer of FIG. 2, according to an illustrative embodiment of the present invention.

As discussed above with reference to FIG. 4, latches 610 and 613 of FIG. 6 may be configured to provide the same voltage on both differential outputs. In particular, in bypass mode and/or high path calibration mode, latch 610 may provide a low (or high) voltage signal on both different outputs while latch 613 provides a high voltage signal on both different outputs. In low path calibration mode, on the other hand, latch 613 may provide a low (or high) voltage signal on both different outputs while latch 610 provides a high voltage signal on both different outputs. Thus, the loading effects of transistors 424-427 of FIG. 4 may be minimized when the respective transistor is disabled. This functionality may be implemented, for example, by including four additional switches in each of latches 610 and 613 of FIG. 6. Specifically, within each latch, two switches may connect a first of the two differential outputs to voltage high and voltage low, respectively and two other switches may connect a second of the two differential outputs to voltage high and voltage low, respectively. In normal mode, the switches are opened and the output of each latch follows the stored input. In the other modes, the switches are configured to output the same voltage on each of the differential outputs.

FIG. 6 depicts an exemplary implementation of DFE 112 of FIG. 1 and DFE 200 of FIG. 2, in accordance with some embodiments of the present invention. In particular, FIG. 6 shows illustrative DFE 600, which may be substantially similar to DFE 112 of FIG. 1 and/or DFE 200 of FIG. 2. As shown, DFE 200 may include summers 602 and 604, multiplexers 606 and 608, and latches 610-615. The signal path including summer 202 corresponds to the DFE high path, while the signal path including summer 204 corresponds to the DFE low path. In addition, the signal path including latches 611 and 612 corresponds to the even clock path, while the signal path including latches 614 and 615 corresponds to the odd clock path.

Summers 602 and 604 are implemented as shown and described in connection with summer 300 of FIG. 3. In particular, each summer is a three-stage circuit containing three differential pairs arranged in parallel. In each of summers 602 and 604, the first differential pair receives complementary input signals (e.g., from the CTLE), and the second differential pair receives a delayed output signal from multiplexer 608, which corresponds to the previous input signal value. Summer 602 is disposed in the DFE high path and therefore the third differential pair is configured to assume a high value (i.e., the differential terminals are tied to voltage high and voltage low, respectively). Summer 604 is disposed in the DFE low path and therefore the third differential pair is configured to assume a low value (i.e., the differential terminals are tied to voltage low and voltage high, respectively).

Thus, summers 602 and 604 are configured to sum the incoming signal with a feedback signal and a path-specific signal, both of which represent previous incoming signals (i.e., delayed for a half and a full clock period), to compensate for ISI. Summer 602 receives the feedback signal from multiplexer 608 and generates a high signal for the path-specific signal. Summer 604 also receives the feedback signal from multiplexer 608 and generates a low signal for the path-specific signal. Multiplexer 606 then determines which path to select based on the outputs of latches 610 and 613, which store previous output signals during alternating clock cycles.

Summers 602 and 604 may additionally include offset cancellation in the first differential stage, and bypass switches in the second and third stages. In particular, the input differential stages may include resistor degeneration between the two transistors forming the differential pair, e.g., at the source (or emitter) terminals of the two transistors. This resistor degeneration enables offset cancellation using the summing currents of the first differential stage, which avoids loading the high speed input paths and improves input sensitivity to the DFE. The second and third stages may each include switches for turning off their summing currents, thereby disabling the stages and reducing power consumption by the summers.

The current sources in summers 602 and 604 may each be variable and controlled by programmable logic (e.g., logic circuitry 116 of FIG. 1).
Accordingly, programmable logic may provide control signal lines (e.g., control signals 126 of FIG. 1) connected to each of the current sources. For example, programmable logic may control the configuration of the switches in each summer, and may set a control and/or enabling voltage for each current source.

Multiplexer 606 may be implemented as shown and described with reference to multiplexer 400 of FIG. 4. In particular, multiplexer 606 may be a stacked multiplexer that receives differential signals from summers 602 and 604, latches 610 and 613, and the clock signal (e.g., from an interpolator). Depending on the values of these signals, multiplexer 606 outputs one of the signals provided by summer 602 and summer 604, as explained above. Multiplexer 606 may provide differential output signals to latches 610, 611, 613 and 614 as well as to output circuitry (e.g., CDR circuitry).

As described above, multiplexer 606 includes bypass and calibration features. In particular, multiplexer 606 can be configured, in bypass mode, to pass any data from summer 602 directly to the output. Multiplexer 606 can also be configured, in the calibration modes, to maintain any or all of its transistors active.

Latches 610-615 may each be implemented as shown and described in connection with latch 500 of FIG. 5. In particular, latches 610, 611, and 615 may each be configured to store data when the clock cycle is high and to provide the previously stored signal when the clock is low. Latches 612, 613, and 614 may each be configured to store data when the clock cycle is low and to provide the previously stored signal when the clock is high. Latches 610, 611, 613, and 614 are each connected to multiplexer 606. Latches 610 and 611 store the output from multiplexer 606 when the clock is high and output the previously stored output when the clock is low. Latch 610 provides output back to multiplexer 606 and latch 611 provides output to latch 612. In turn, latch 612 stores the output of latch 611 when the clock is low. Latches 613 and 614 store the output from multiplexer 606 when the clock is low and output the previously stored output when the clock is high. Latch 613 provides output back to multiplexer 606 and latch 614 provides output to latch 615. In turn, latch 615 stores the output of latch 614 when the clock is low.

Latches 612 and 615 are each connected to multiplexer 608. Latch 612 is configured to provide its stored contents to multiplexer 608 when the clock is high, during which time multiplexer 608 provides that output to summers 602 and 604. Latch 615 is configured to provide its stored contents to multiplexer 608 when the clock is low, during which time multiplexer 608 provides that output to summers 602 and 604. Thus, in normal mode, when the clock is high, latches 610 and 611 store the current output signal from multiplexer 606, and latch 612 provides the twice delayed output signal (i.e., the output signal when the clock was last high, a full period in the past) to multiplexer 608, which provides that signal to summers 602 and 604. At the same time, latches 613 and 614 provide the previous output signal (i.e., the output signal when the clock was last low, half a period in the past) to multiplexer 606 and latch 615, respectively. Multiplexer 606 is configured to choose an output based on the received signal from latch 613, and latch 615 stores the value being outputted by latch 614 for later use. On the other hand, when the clock is low, latches 613 and 614 store the current output signal from multiplexer 606, and latch 615 provides the twice delayed output signal (i.e., the output signal when the clock was last low, a full period in the past) to multiplexer 608, which provides that signal to summers 602 and 604. At the same time, latches 610 and 611 provide the previous output signal (i.e., the output signal when the clock was last high, half a period in the past) to multiplexer 606 and latch 612, respectively.
Multiplexer 606 is configured to chose an output based on the received signal from latch 610, and latch 612 stores the value being outputted by latch 611 for later use.

As depicted in FIG. 6, DFE 600 is a two-tap DFE having a look-ahead structure. With reference to FIG. 3, the second and third differential pairs of summers 602 and 604 (i.e., transistors 332 and 333 and transistors 334 and 335) are connected to the second and first taps, respectively. In one approach, the first tap is assigned a higher weight than the second tap, and so current source 343 may be set to provide a larger amount of current than current source 342. In another approach, only the first tap may be necessary. Accordingly, in some embodiments, transistors 332 and 333, current source 342, and switches 312 and 313 are not present in summers 602 and 604. In addition, latches 611, 612, 614, and 615, as well as multiplexer 608 may not be present in DFE 600 of FIG. 6. In these embodiments, transistors 330 and 331 together with transistors 334 and 335 may provide the look-ahead functionality of the DFE with a single tap.

Figure 7:
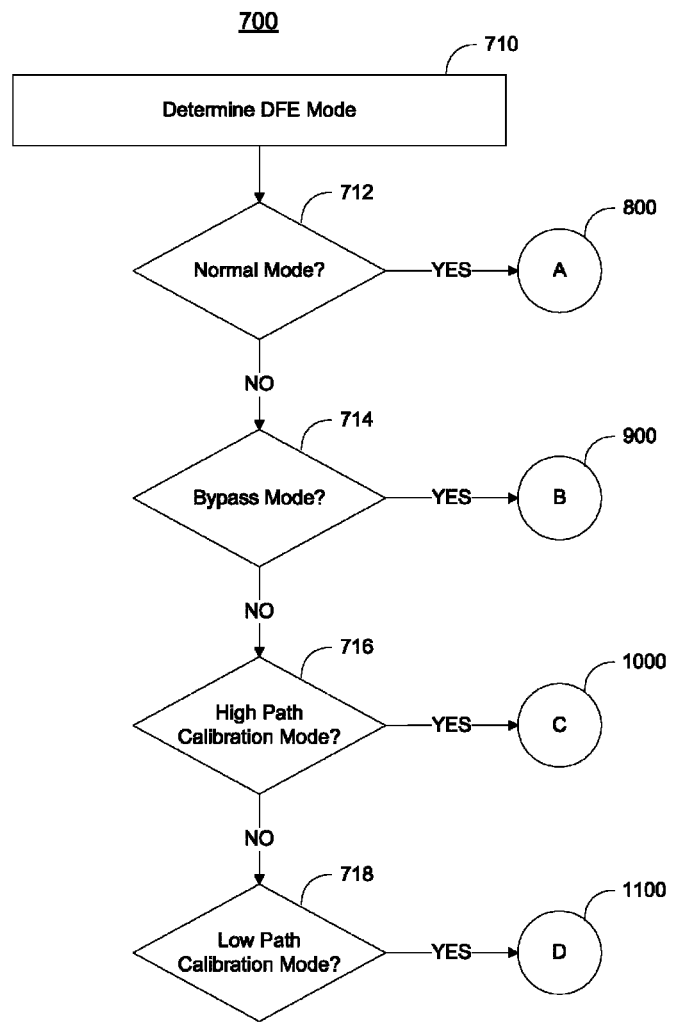
FIG. 7 is a flow chart of illustrative steps performed in determining a mode for the decision feedback equalizer, according to an illustrative embodiment of the present invention.

As discussed above, programmable logic (i.e., logic circuitry 116 of FIG. 1) may be connected to DFE 600 to configure DFE in one of four modes: normal mode, bypass mode, high path calibration mode and low path calibration mode. FIG. 7 is a flow chart of illustrative steps performed in determining a mode for the decision feedback equalizer, according to an illustrative embodiment of the present invention. At step 710 the programmable logic determines the mode in which to configure the DFE. The mode may be selected automatically or the DFE may receive user input specifying the mode. For example, in the absence of user input to contrary, the programmable logic may select normal mode for its determination (i.e., it may default to normal mode). As another example, when initiated for the first time, or after an initialization routine is executed, the mode may be determined to be high path or low path calibration mode. As yet another example, the programmable logic may configure the DFE for low path calibration mode automatically upon completing high path calibration, or vice versa. As a final example, the programmable logic may configure the DFE for bypass mode upon determining that use of the DFE is unnecessary (either automatically or based on user input). In an embodiment, the programmable logic may select between normal mode or bypass mode based on the frequency of the input signal. In another embodiment, a control signal may be generated by the CTLE to indicate whether to enter bypass mode.

At step 712 the programmable logic determines whether the determined mode is normal mode. If so, the programmable logic may configure the DFE as illustrated in process 800 of FIG. 8, discussed below. At step 714 the programmable logic determines whether the determined mode is bypass mode. If so, the programmable logic may configure the DFE as illustrated in process 900. At step 716 the programmable logic determines whether the determined mode is high path calibration mode. If so, the programmable logic may configure the DFE as illustrated in process 1000. Finally, at step 718 the programmable logic determines whether the determined mode is low path calibration mode. If so, the programmable logic may configure the DFE as illustrated in process 1100.

Figure 8:
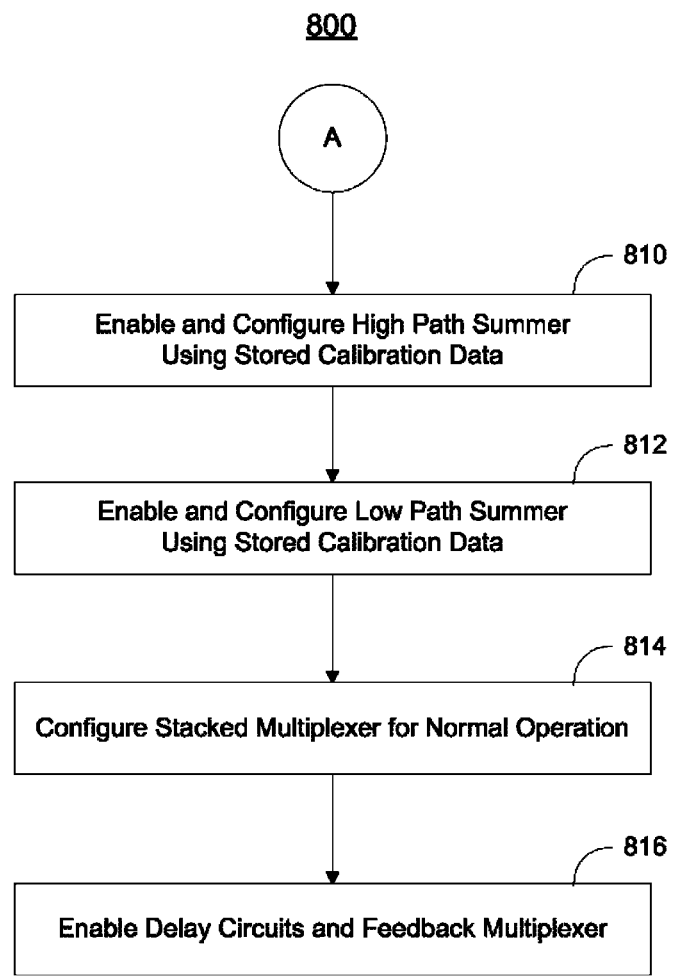
FIG. 8 is a flow chart of illustrative steps performed when using the decision feedback equalizer in a normal mode, according to an illustrative embodiment of the present invention.

FIG. 8 is a flow chart of illustrative process 800 performed when using the decision feedback equalizer in normal mode, according to an illustrative embodiment of the present invention. At step 810, the programmable logic may enable and configure the high path summer to sum signals corresponding to the input signal, the feedback signal, and a high signal. In particular, in normal mode, the programmable logic may set the variable current sources in summer 602 to appropriate values based on stored calibration data. For example, with reference to FIG. 3, the programmable logic may provide control voltages (e.g., Vb) to set the current level through variable current sources 340-343. Programmable logic may also configure the switches in summer 602 for normal operation.
Specifically, the bypass switch in summer 602 is opened and the bias control switches are closed. For example, with reference to FIG. 3, switches 310, 312 and 314 are closed and switches 313 and 315 are opened. In an embodiment, programmable logic also configures summer 602 for the high path by setting the inputs of the third differential stage accordingly. Referring to FIG. 3, for instance, the inputs of transistors 334 and 335 are tied to voltage high (e.g., Vdd) and voltage low (e.g., Vss), respectively.

At step 812, the programmable logic may enable and configure the low path summer to sum signals corresponding to the input signal, the feedback signal, and a low signal. In particular, in normal mode, the programmable logic may set the variable current sources in summer 604 to appropriate values based on stored calibration data. For example, with reference to FIG. 3, the programmable logic may provide control voltages (e.g., Vb) to set the current level through variable current sources 340-343. Programmable logic may also configure the switches in summer 604 for normal operation. Specifically, the bypass switch in summer 604 is opened and the bias control switches are closed. For example, with reference to FIG. 3, switches 310, 312 and 314 are closed and switches 313 and 315 are opened. In an embodiment, programmable logic also configures summer 604 for the low path by setting the inputs of the third differential stage accordingly. Referring to FIG. 3, for instance, the inputs of transistors 334 and 335 are tied to voltage low (e.g., Vdd) and voltage high (e.g., Vss), respectively.

The DC offset cancellation for the high path and low path may be different. Accordingly, programmable logic may configure summing currents in the first differential stage of summers 602 and 604 (i.e., current sources 340 and 341) differently. In an embodiment, the coefficients of the variable current sources in the second and/or third differential stages of summers 602 and 604 are the set to same value. Of course, as described above, the polarity of the coefficient for the third stage current source differs for the high path and the low path. That is, summer 602 assumes the delayed output signal is a high value, while summer 604 assumed the delayed output signal is a low value.

At step 814, the programmable logic may configure the stacked multiplexer to select one of the outputs from the high path and low path based on the feedback signal and the clock signal. Specifically, the bypass switches in multiplexer 606 are opened and the clock switches are closed. For instance, with reference to FIG. 4, switches 430 and 434 are closed and switches 431 and 433 are opened (switches 432 and 435 may also be opened when present).

Finally, at step 816, the DFE delay circuits and feedback multiplexer may be enabled. In particular, the bypass switches in latch circuits 610-615 are opened and the clock switches are closed. For example, with reference to FIG. 5, switches 530 and 532 are closed and switches 531 and 533 are opened. Although not shown, multiplexer 608 may also include one or more switches that enable or disable the transistors in the multiplexer; in normal mode, these switches are also configured to enable the multiplexer to operate normally.

Figure 9:
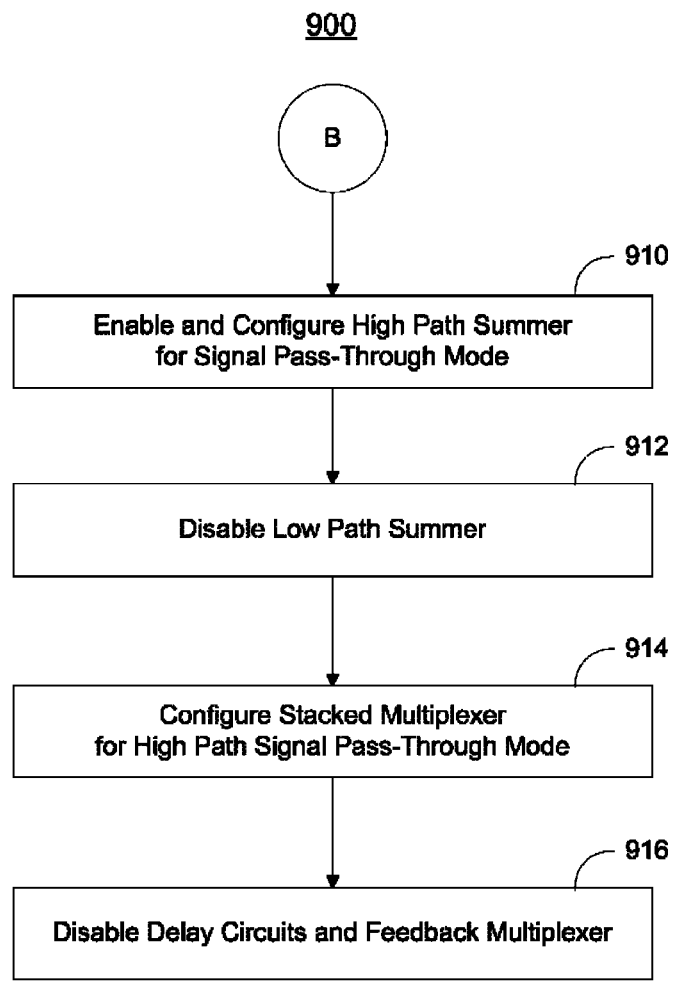
FIG. 9 is a flow chart of illustrative steps performed when using the decision feedback equalizer in a bypass mode, according to an illustrative embodiment of the present invention.

FIG. 9 is a flow chart of illustrative process 900 performed when using the decision feedback equalizer in bypass mode, according to an illustrative embodiment of the present invention. In bypass mode, the programmable logic may configure the current sources and switches in DFE 600 for bypass operation, which disables the equalizing function of the DFE and reduces the power consumption of its component parts. At step 910, the programmable logic may enable and configure the high path summer to pass the input signal to the output without equalizing the signal. In particular, in bypass mode, the programmable logic may set the variable current sources in summer 602 to low or zero values, e.g., based on stored calibration data. For example, with reference to FIG. 3, the programmable logic may provide control voltages (e.g., Vb) to set the current level through variable current sources 340-343. In one approach, sources 340 and 341 are set to a current just high enough to keep the first differential stage active, while sources 342 and 343 are disabled. In an embodiment, the bypass switches in summer 602 are closed and the bias control switches are opened. For example, with reference to FIG. 3, switches 312 and 314 are opened and switches 313 and 315 are closed. This connects the variable sources in the second and third differential stages to voltage low thereby disabling those stages. Of course, since the high path remains enabled, switch 310 of summer 602 remains closed in bypass mode.

At step 912, the programmable logic may disable the low path summer. In an embodiment, switch 310 of low path summer 604 is disconnected, thereby disabling the summer. Additionally, or alternatively, the current sources in low path summer 604 are disabled or set to low current. For example, with reference to FIG. 3, the programmable logic may provide control voltages (e.g., Vb) to set the current level through variable current sources 340-343 to low or zero current. In another embodiment, the bypass switches in summer 604 are closed and the bias control switches are opened. For example, with reference to FIG. 3, switches 312 and 314 are opened and switches 313 and 315 are closed. This connects the variable sources in the second and third differential stages to voltage low thereby disabling those stages. Although bypass mode is described herein as utilizing the high path as the pass-through signal path, and the low path is disabled, it should be understood that the low path may be used instead, and the high path may be disabled.

At step 914, the programmable logic may configure the stacked multiplexer to pass through the high path output signal (i.e., the DFE input signal). Specifically, in bypass mode, the bypass switches in multiplexer 606 are closed and the clock switches are opened. For instance, with reference to FIG. 4, switches 430 and 434 are opened and switches 431 and/or 433 are closed (switches 432 and 435 may be opened or closed in this mode, as appropriate, when present). The programmable logic may also configure the DFE to ensure that the inputs at one or more of transistors 420-429 are properly set. For instance, the inputs at transistors 422 and 423 may be set to voltage low in order to disable those transistors.

At step 916, the programmable logic may disable the DFE delay circuits and feedback multiplexer. In particular, the bypass switches in latch circuits 610-615 are closed and the clock switches are opened. For example, with reference to FIG. 5, switches 530 and 532 are opened and switches 531 and 533 are closed, thereby disabling the latches. Although not shown, multiplexer 608 may also include one or more switches that enable or disable the transistors in the multiplexer; in bypass mode, these switches are also configured to disable the multiplexer and reduce power consumption.

In an exemplary embodiment, in bypass mode, high path summer 602 of FIG. 6 is configured to reduce its power consumption and to minimize loading effects. In particular, with reference to FIG. 3, the inputs to transistors 332-335, as well as current sources 342 and 343, are pulled to voltage low (Vss). For example, logic circuitry may: configure multiplexer 608 of FIG. 6 to output a low voltage on each of its differential outputs, thus pulling transistors 332 and 333 low; configure switches 313 and 315 to connect current sources 342 and 343 to low voltage, thus minimizing or turning off the generated current; and configure switches at the inputs of transistors 334 and 335 (not shown, but as described above) to connect transistors 334 and 335 to low voltage. Low path summer 604 may be configured similarly in addition to disconnecting the summer from power, as described above. Moreover, tail currents in multiplexer 606 may be disabled by configuring switches within latches 610 and 613 of FIG. 6. For example, latch 610 may be configured to output voltage high on both of its differential outputs, while latch 613 is configured to output voltage low on both of its differential outputs.

Figure 10:
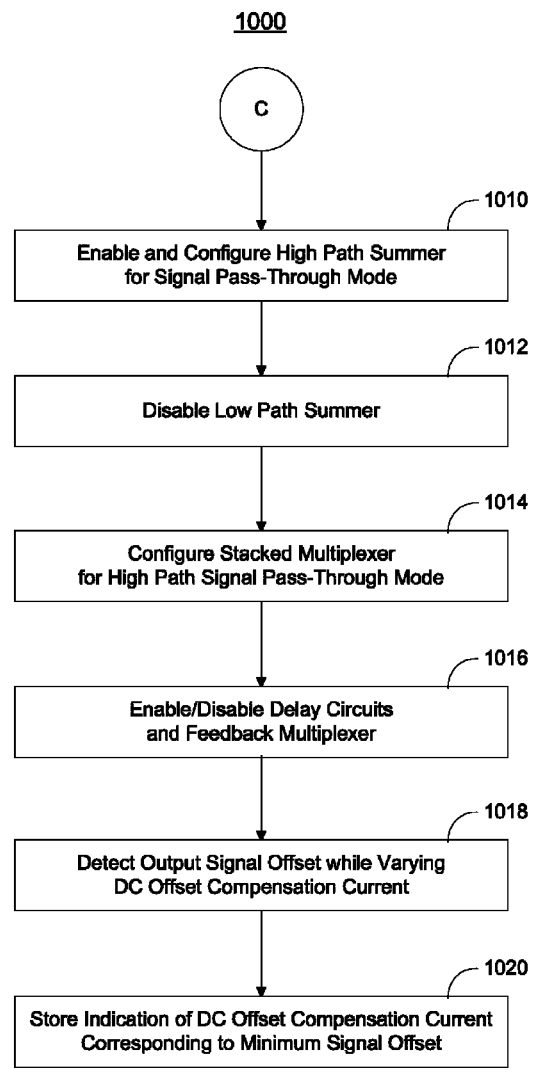
FIG. 10 is a flow chart of illustrative steps performed when using the decision feedback equalizer in a high path calibration mode, according to an illustrative embodiment of the present invention.

FIG. 10 is a flow chart of illustrative process 1000 performed when using the decision feedback equalizer in high path calibration mode, according to an illustrative embodiment of the present invention. In high path calibration mode, the programmable logic enables the high path while disabling the low path. The programmable logic then proceeds to vary the DC offset currents (i.e., using a control signal) in the high path, while monitoring the output signal, to determine the point at which signal offset is at a minimum. The value of the control signal at that minimum point is stored in memory as high path calibration data. In some embodiments, this process is performed automatically, i.e., the optimal offset point is determined by the programmable logic and the corresponding control signal value is automatically stored in memory as high path calibration data.

At step 1010, the programmable logic may enable and configure the high path summer to pass the input signal to the output without equalizing the signal. In particular, the programmable logic may set certain variable current sources in summer 602 to low or zero values. For example, with reference to FIG. 3, the programmable logic may provide control voltages (e.g., Vb) to set the current level through variable current sources 342 and 343 to low or zero current. In one approach, sources 340 and 341 are initially set to a current just high enough to keep the first differential stage active. In another approach, sources 340 and 341 are initially set to a current determined based on previously stored calibration data. In an embodiment, the bypass switches in summer 602 are closed and the bias control switches are opened. For example, with reference to FIG. 3, switches 312 and 314 are opened and switches 313 and 315 are closed. This connects the variable sources in the second and third differential stages to voltage low thereby disabling those stages. Of course, since the high path remains enabled, switch 310 of summer 602 remains closed in high path calibration mode.

At step 1012, the programmable logic may disable the low path summer. In an embodiment, switch 310 of low path summer 604 is disconnected, thereby disabling the summer. Additionally, or alternatively, the current sources in low path summer 604 are disabled or set to low current. For example, with reference to FIG. 3, the programmable logic may provide control voltages (e.g., Vb) to set the current level through variable current sources 340-343 to low or zero current. In another embodiment, the bypass switches in summer 604 are closed and the bias control switches are opened. For example, with reference to FIG. 3, switches 312 and 314 are opened and switches 313 and 315 are closed. This connects the variable sources in the second and third differential stages to voltage low thereby disabling those stages.

At step 1014, the programmable logic may configure multiplexer 606 to pass through the high path data, as in bypass mode. Specifically, the bypass switches in multiplexer 606 are closed and the clock switches are opened. For instance, with reference to FIG. 4, switches 430 and 434 are opened and switches 431 and/or 433 are closed (switches 432 and 435 may be opened or closed in this mode, as appropriate, when present). The programmable logic may also configure the DFE to ensure that the inputs at one or more of transistors 420-429 are properly set. For instance, the inputs at transistors 422 and 423 may be set to voltage low in order to disable those transistors.

At step 1016, the programmable logic may enable or disable the DFE delay circuits and feedback multiplexer, as desired. In one approach, latches 610-615 and/or multiplexer 608 are disabled by programmable logic when in high path calibration mode, as in bypass mode. In this approach, for example, the loading effects of the delay circuits and/or multiplexer may be insignificant (or assumed to be insignificant). In other approaches, latches 610-615 and/or multiplexer 608 are enabled by programmable logic when in high path calibration mode, and/or may be configured to remain in a steady state (i.e., the clock signal provided to these components may be held at voltage high or voltage low). In this approach, for example, the loading effects of the delay circuits and/or multiplexer may be factored into the calibration.

When disabling the circuits, the bypass switches in latch circuits 610-615 are closed and the clock switches are opened. For example, with reference to FIG. 5, switches 530 and 532 are opened and switches 531 and 533 are closed, thereby disabling the latches. Although not shown, multiplexer 608 may also include one or more switches that enable or disable the transistors in the multiplexer; these switches may be configured to disable the multiplexer. When enabling the circuits, the bypass switches in latch circuits 610-615 are opened and the clock switches are closed. For example, with reference to FIG. 5, switches 530 and 532 are closed and switches 531 and 533 are opened. In alternative embodiments, latch circuits 610-615 are active but not enabled, i.e., the clock signal is replaced by a high or low constant input. Although not shown, multiplexer 608 may also include one or more switches that enable or disable the transistors in the multiplexer; these switches may also be configured to enable the multiplexer to operate normally, or to remain active only, i.e., the clock signal is replaced by a high or low constant input.

At step 1018, the programmable logic may monitor the DFE output signal (i.e., from the stacked multiplexer in high path pass-through configuration) while varying the DC offset cancellation current (e.g., current sources 340 and 341 of FIG. 3). The programmable logic may compare the monitored values to detect the optimal setting, i.e., the value of the control signal that results in minimal signal offset. At step 1020, the programmable logic may store an indication of the DC offset cancellation current that corresponds to minimal signal offset. For example, the value of the control signal (generated by the programmable logic to control the current sources) at the optimal offset point may be stored as the high path calibration data.

Figure 11:
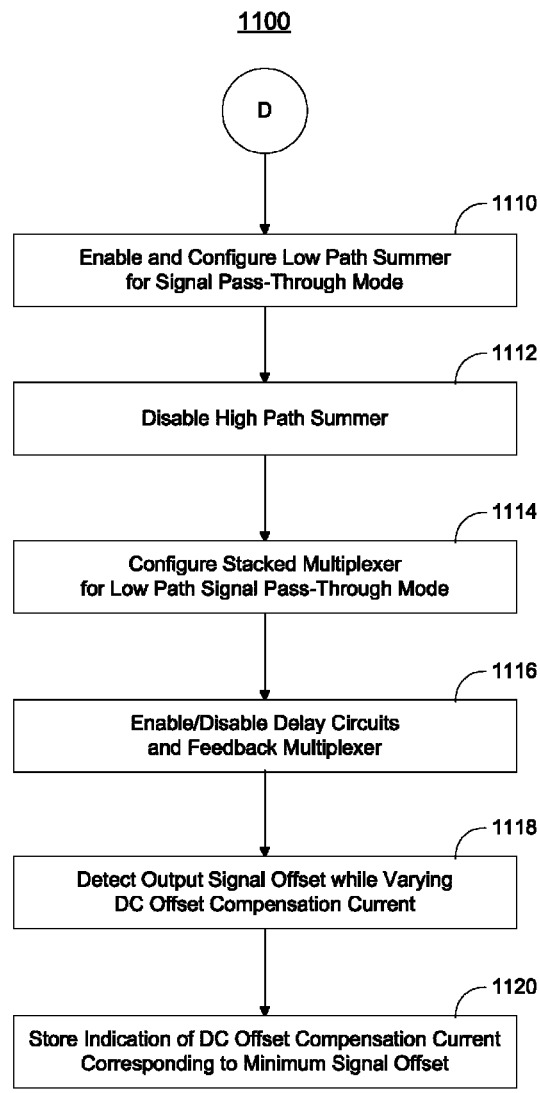
FIG. 11 is a flow chart of illustrative steps performed when using the decision feedback equalizer in a low path calibration mode, according to an illustrative embodiment of the present invention.

FIG. 11 is a flow chart of illustrative process 1100 performed when using the decision feedback equalizer in low path calibration mode, according to an illustrative embodiment of the present invention. In low path calibration mode, the programmable logic enables the low path while disabling the high path. The programmable logic then proceeds to vary the DC offset currents (i.e., using a control signal) in the low path, while monitoring the output signal, to determine the point at which signal offset is at a minimum. The value of the control signal at that minimum point is stored in memory as low path calibration data. In some embodiments, this process is performed automatically, i.e., the optimal offset point is determined by the programmable logic and the corresponding control signal value is automatically stored in memory as low path calibration data.

At step 1110, the programmable logic may enable and configure the low path summer to pass the input signal to the output without equalizing the signal. In particular, the programmable logic may set certain variable current sources in summer 604 to low or zero values. For example, with reference to FIG. 3, the programmable logic may provide control voltages (e.g., Vb) to set the current level through variable current sources 342 and 343 to low or zero current. In one approach, sources 340 and 341 are initially set to a current just high enough to keep the first differential stage active. In another approach, sources 340 and 341 are initially set to a current determined based on previously stored calibration data. In an embodiment, the bypass switches in summer 604 are closed and the bias control switches are opened. For example, with reference to FIG. 3, switches 312 and 314 are opened and switches 313 and 315 are closed. This connects the variable sources in the second and third differential stages to voltage low thereby disabling those stages. Of course, since the low path remains enabled, switch 310 of summer 604 remains closed in low path calibration mode.

At step 1112, the programmable logic may disable the high path summer. In an embodiment, switch 310 of high path summer 602 is disconnected, thereby disabling the summer. Additionally, or alternatively, the current sources in high path summer 602 are disabled or set to low current. For example, with reference to FIG. 3, the programmable logic may provide control voltages (e.g., Vb) to set the current level through variable current sources 340-343 to low or zero current. In another embodiment, the bypass switches in summer 602 are closed and the bias control switches are opened. For example, with reference to FIG. 3, switches 312 and 314 are opened and switches 313 and 315 are closed. This connects the variable sources in the second and third differential stages to voltage low thereby disabling those stages.

At step 1114, the programmable logic may configure multiplexer 606 to pass through the low path data. Specifically, the bypass switches in multiplexer 606 are closed and the clock switches are opened. For instance, with reference to FIG. 4, switches 430 and 434 are opened and switches 431 and/or 433 are closed (switches 432 and 435 may be opened or closed in this mode, as appropriate, when present). The programmable logic may also configure the DFE to ensure that the inputs at one or more of transistors 420-429 are properly set. For instance, the inputs at transistors 420 and 421 may be set to voltage low in order to disable those transistors.

At step 1116, the programmable logic may enable or disable the DFE delay circuits and feedback multiplexer, as desired. In one approach, latches 610-615 and/or multiplexer 608 are disabled by programmable logic when in low path calibration mode, as in bypass mode. In this approach, for example, the loading effects of the delay circuits and/or multiplexer may be insignificant (or assumed to be insignificant). In other approaches, latches 610-615 and/or multiplexer 608 are enabled by programmable logic when in low path calibration mode, and/or may be configured to remain in a steady state (i.e., the clock signal provided to these components may be held at voltage high or voltage low). In this approach, for example, the loading effects of the delay circuits and/or multiplexer may be factored into the calibration. These circuits may be enabled or disabled as discussed above in connection with FIG. 10.

At step 1118, the programmable logic may monitor the DFE output signal (i.e., from the stacked multiplexer in low path pass-through configuration) while varying the DC offset cancellation current (e.g., current sources 340 and 341 of FIG. 3). The programmable logic may compare the monitored values to detect the optimal setting, i.e., the value of the control signal that results in minimal signal offset. At step 1120, the programmable logic may store an indication of the DC offset cancellation current that corresponds to minimal signal offset. For example, the value of the control signal (generated by the programmable logic to control the current sources) at the optimal offset point may be stored as the low path calibration data.

High path and low path calibration may be performed separately to achieve the best DC offset cancellation for the DFE. In these modes, the output of the CTLE may be forced to 0.7V. As discussed above, when the high path is calibrated, the low path is disabled by disconnecting summer circuit 604 from power. For example, referring to FIG. 3, switch 310 is opened, and the summing nodes of the low path are pulled to a low state. The clock switch in multiplexer 606 is configured to select the high path signals for output and to prevent the low path data from being output. In addition the latch outputs are forced to voltage high to ensure the appropriate path in the stacked multiplexer 606 is turned on. Once configured, the programmable logic may sweep memory (e.g., 8 random-access memory bits) to calibrate the offset. In other words, the programmable logic may monitor the output of DFE 600 as it adjusts the coefficients of the summing current sources in the first differential stage of summer 602 to determine optimal offset cancellation. In low path calibration mode, the same process may be performed, but the high path is disabled and the low path is enabled. That is, summer 602 is disconnected from power and multiplexer 604 selects the low path signal for output. When sweeping the memory bits for optimal offset cancellation, the programmable logic may detect differential zero crossing points and store a record of the detected point in memory. It should be understood that the stored calibration data is retrieved by the programmable logic in normal mode to set the current sources for optimal offset cancellation.

The present invention therefore provides a highly flexible equalization system for, e.g., a 25 Gb/s or 28 Gb/s receiver with a 1.0V power supply, which may be implemented in 28 nm CMOS technology. The equalizer system includes bypass and offset cancellation functions, which allow the CTLE to run independently or together with the DFE, configurable using programmable logic (e.g., on an FPGA or CPLD). Accordingly, the DFE can be bypassed when it is not needed, thereby saving power. Due to the presence of offset cancellation, the equalizer also permits operation at lower input sensitivity, which improves BER without incurring a power penalty.

In practice, one or more steps shown in processes 700, 800, 900, 1000, and 1100 may be combined with other steps, preformed in any suitable order, performed in parallel (e.g., simultaneously or substantially simultaneously), or removed. Moreover, these processes may be implemented using any suitable combination of hardware and/or software in any suitable fashion.

The above described embodiments of the present invention are presented for purposes of illustration and not of limitation, and the present invention is limited only by the claims which follow.

What is claimed is:

1. A programmable integrated circuit device comprising:
a decision feedback equalizer configured to equalize an input signal, wherein the decision feedback equalizer comprises:
a summer circuit configured to sum the input signal with a plurality of signals, wherein the summer circuit includes a first transistor and second transistor arranged as a differential pair;
the first transistor configured to receive the input signal and the second transistor configured to receive a complement of the input signal;
a resistor disposed between the first transistor and the second transistor configured to provide resistor degeneration;
a first current source disposed at a first node connecting the first transistor and the resistor, the first current source configured to provide offset cancellation; and
a second current source disposed at a second node connecting the second transistor and the resistor, the second current source configured to provide offset cancellation; and
logic circuitry configured to control the first current source and the second current source based on stored calibration data.

2. The programmable integrated circuit device of claim 1, wherein the logic circuitry is further configured to:
monitor an output of the summer circuit while varying a first control signal that controls the first current source and the second current source;
detect a minimal level of offset in the output based on the monitoring; and
store an indication of the first control signal as part of the calibration data when the minimal level of offset is detected.

3. The programmable integrated circuit device of claim 1, wherein the summer circuit further comprises:
a third transistor and a fourth transistor arranged as a differential pair, wherein the third transistor is configured to receive a feedback signal and the fourth transistor is configured to receive a complement of the feedback signal;
a third current source disposed at a third node connecting the third transistor and the fourth transistor, the third current source configured to receive a second control signal that controls the third current source; and
a first switch disposed between the third current source and the logic circuitry and a second switch disposed between the third current source and a low voltage;
wherein the logic circuitry is further configured to generate the second control signal and to control the first switch and second switch.

4. The programmable integrated circuit device of claim 3, wherein the logic circuitry is further configured to close the first switch and open the second switch when in a first mode, and to open the first switch and close the second switch when in a second mode.

5. The programmable integrated circuit device of claim 1, wherein the decision feedback equalizer further comprises a switch disposed between the summer circuit and a voltage source, wherein the logic circuitry is further configured to control the switch.

6. The programmable integrated circuit device of claim 1, wherein the summer circuit is a first summer circuit and the plurality of signals is a first plurality of signals, the decision feedback equalizer further comprising:
a second summer circuit configured to sum the input signal with a second plurality of signals;
a stacked multiplexer configured to receive a first internal signal from the first summer circuit, a second internal signal from the second summer circuit, a first delayed output signal, a second delayed output signal, and a clock signal, and to select one of the first internal signal and the second internal signal for output; and
first delay circuitry configured to receive the output of the stacked multiplexer and to output the first delayed output signal; and
second delay circuitry configured to receive the output of the stacked multiplexer and to output the second delayed output signal.

7. The programmable integrated circuit device of claim 6 further comprising:
third delay circuitry configured to receive the output of the stacked multiplexer and to output a third delayed output signal;

fourth delay circuitry configured to receive the output of the stacked multiplexer and to output a fourth delayed output signal; and a multiplexer configured to receive the third delayed output signal from the third delay circuitry and the fourth delayed output signal from the fourth delay circuitry and to provide one of the third delayed output signal and fourth delayed output signal to the first summer circuit and the second summer circuit.

8. The programmable integrated circuit device of claim 7, wherein the logic circuitry is further configured to control a plurality of switches disposed within the first summer circuit, second summer circuit, the stacked multiplexer, the first delay circuitry, the second delay circuitry, the third delay circuitry, and the fourth delay circuitry.

9. The programmable integrated circuit device of claim 8, wherein the logic circuitry is further configured to:
   determine whether the decision feedback equalizer is in a first mode or a second mode;
   disable, using the plurality of switches, the second summer circuit, the first delay circuitry, the second delay circuitry, the third delay circuitry, and the fourth delay circuitry when the decision feedback equalizer is in the first mode;
   configure, using the plurality of switches, the stacked multiplexer to select the first internal signal for output when the decision feedback equalizer is in the first mode;
   enable, using the plurality of switches,
   the second summer circuit, the first delay circuitry, the second delay circuitry, the third delay circuitry, and the fourth delay circuitry when the decision feedback equalizer is in the second mode; and
   configure, using the plurality of switches, the stacked multiplexer to select one of the first internal signal and the second internal signal for output depending on the first delayed output signal and the second delayed output signal when the decision feedback equalizer is in the second mode.

10. The programmable integrated circuit device of claim 9, wherein the logic circuitry is further configured to:
   determine whether the decision feedback equalizer is in a third mode;
   disable, using the plurality of switches, the first summer circuit, the first delay circuitry, the second delay circuitry, the third delay circuitry, and the fourth delay circuitry when the decision feedback equalizer is in the third mode; and
   configure, using the plurality of switches, the stacked multiplexer to select the second internal signal for output when the decision feedback equalizer is in the third mode.

11. A programmable integrated circuit device comprising:
   a continuous time linear equalizer configured to equalize an input signal;
   a decision feedback equalizer configured
   to receive the equalized input signal and to provide an output signal, wherein the decision feedback equalizer comprises a high path and a low path; and
   logic circuitry configured to:
      determine whether the decision feedback equalizer is in a bypass mode; and
      in response to determining that the decision feedback equalizer is in the bypass mode, (a) disable the low path and (b) provide, using the high path, the equalized input signal as the output signal.

12. The programmable integrated circuit device of claim 11, wherein the decision feedback equalizer further comprises:
   a first summer circuit configured to sum the equalized input signal with a first plurality of signals and to output a first internal signal, wherein the first summer circuit comprises a first switch disposed between the first summer circuit and a voltage source, and wherein the first summer circuit is disposed in the high path;
   a second summer circuit configured to sum the equalized input signal with a second plurality of signals and to output a second internal signal, wherein the second summer circuit comprises a second switch disposed between the second summer circuit and the voltage source, and wherein the second summer circuit is disposed in the low path; and
   a multiplexer configured to receive the first internal signal and the second internal signal and to provide one of the first internal signal and the second internal signal at an output of the multiplexer;
   wherein logic circuitry is configured to disable the low path by controlling the second switch to disconnect the second summer circuit from the voltage source; and
   and wherein the logic circuitry is configured to provide the equalized input signal as the output signal by controlling the multiplexer to provide only the first internal signal at the output of the multiplexer.

13. A method for equalizing an input signal using a decision feedback equalizer, the method comprising:
   receiving, with logic circuitry, an
   indication to use the decision feedback equalizer in one of a plurality of modes; and
   in response to the indication:
      providing an input signal to a first summer circuit in the decision feedback equalizer;
      disabling, with the logic circuitry, a second summer circuit coupled to the first summer circuit in the decision feedback equalizer; and
      configuring, with the logic circuitry, a multiplexer coupled to the first summer circuit and the second summer circuit to select a signal generated by the first summer circuit for output.

14. The method of claim 13, wherein the indicated mode is one of a high path calibration mode and a bypass mode.

15. The method of claim 13 further comprising, in response to the indication, disabling a plurality of delay circuits coupled to the multiplexer.

16. The method of claim 13 further comprising:
   receiving, with logic circuitry, a second indication to use the decision feedback equalizer in a second of the plurality of modes; and
   in response to the second indication:
      enabling, with the logic circuitry, the second summer circuit;
      providing the input signal to the first summer circuit and the second summer circuit; and
      configuring the multiplexer, with the logic circuitry, to select one of the signal generated by the first summer circuit and a signal generated by the second summer circuit for output depending on a clock signal and first and second feedback signals.

17. The method of claim 13 further comprising:
   receiving, with logic circuitry, a second indication to use the decision feedback equalizer in a second of the plurality of modes; and
   in response to the second indication:

enabling the second summer circuit, with the logic circuitry, and providing the input signal to the second summer circuit;

disabling the first summer circuit with the logic circuitry; and configuring the multiplexer, with the logic circuitry, to select a signal generated by the second summer circuit for output.

18. The method of claim 13 further comprising:

varying a control signal to control a current source in the first summer circuit;

monitoring the signal generated by the first summer circuit in response to the varying;

detecting an optimal offset cancellation level based on the monitoring; and storing an indication of the control signal as calibration data when the optimal offset cancellation level is detected.

19. The method of claim 18 further comprising, in response to a second indication of a second of the plurality of modes, retrieving the stored calibration data and setting the control signal based on the retrieved calibration data.

20. The method of claim 13, further comprising, in response to the indication, generating a control signal with the logic circuitry, wherein the control signal disables a plurality of current sources in the first summer circuit.

* * * * *